April 3, 1962 G. H. KIRSTEN ET AL 3,027,758
VIBRATION MEASURING APPARATUS
Filed June 9, 1958 3 Sheets-Sheet 2
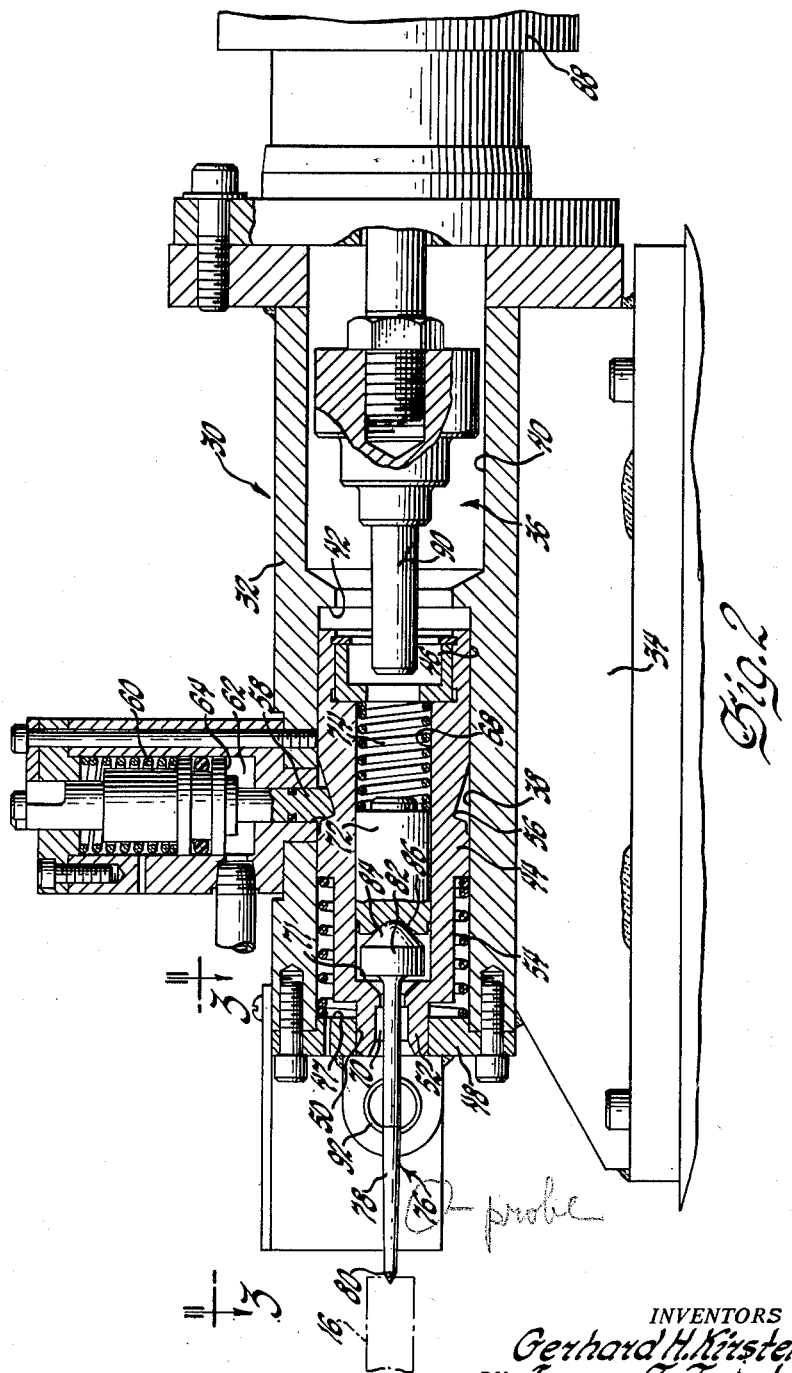
INVENTORS
Gerhard H. Kirsten &
BY James F. Tesch
E.W. Christen
ATTORNEY

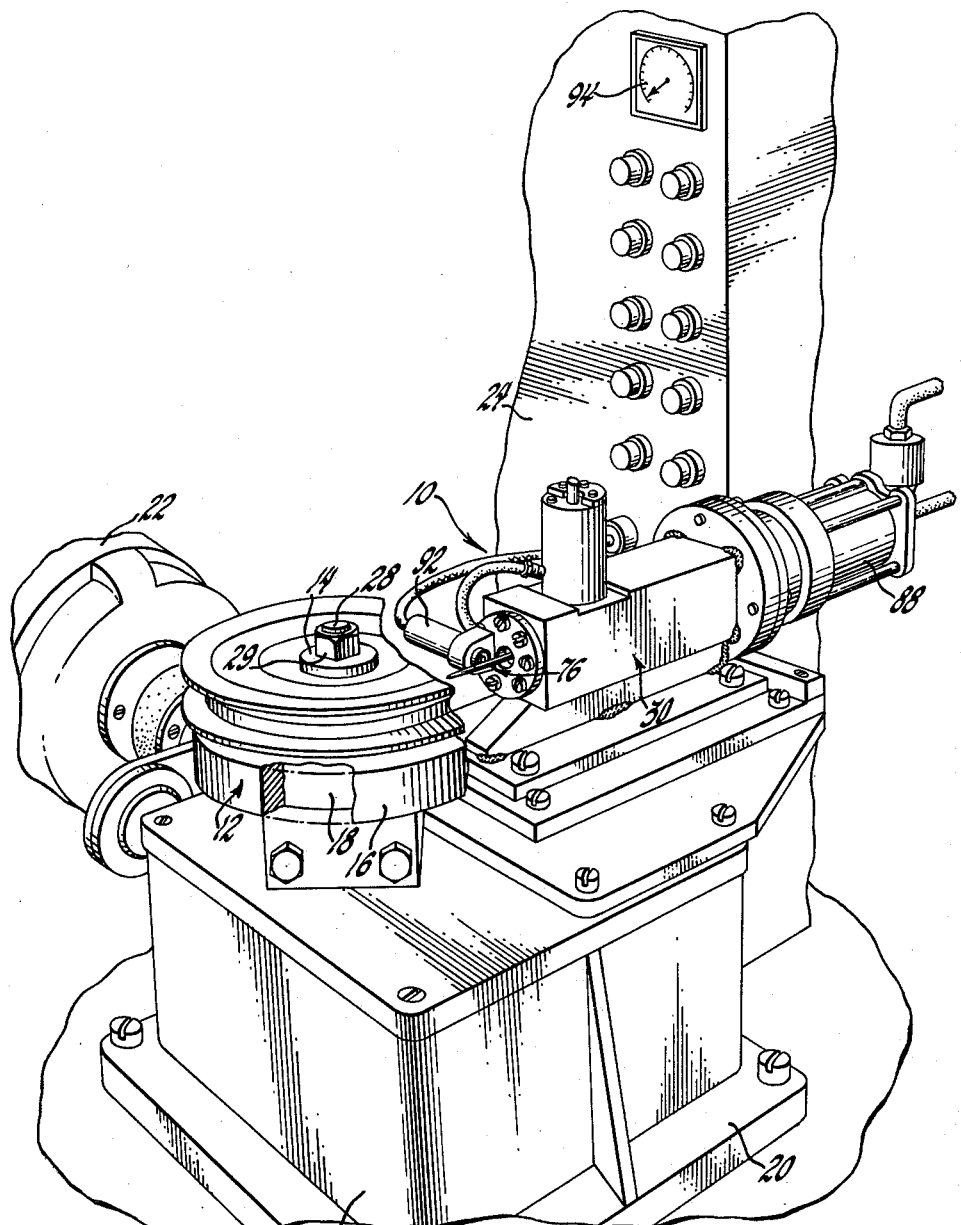

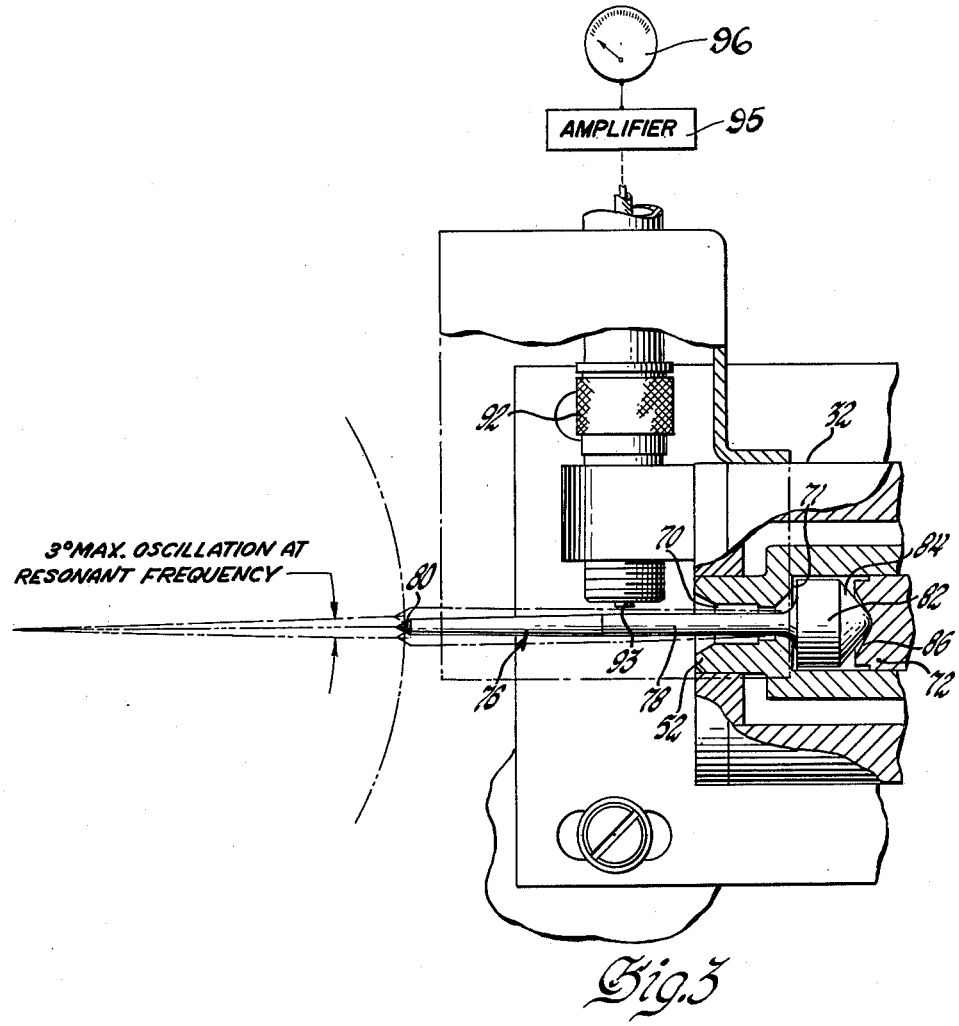

United States Patent Office 3,027,758
Patented Apr. 3, 1962

3,027,758
VIBRATION MEASURING APPARATUS
Gerhard H. Kirsten, Ferndale, and James F. Tesch, Farmington, Mich., assignors to General Motors Corporation, Detroit, Mich., a corporation of Delaware
Filed June 9, 1958, Ser. No. 740,752
4 Claims. (Cl. 73—71.4)

The present invention relates to measuring apparatus and, more particularly, to means for measuring the vibrations in a workpiece.

In order to dampen torsional vibrations in various structures such as a rotating crankshaft in an automotive engine, it is customary to employ a torsional vibration dampener. The dampener is normally mounted directly on the crankshaft to rotate therewith and includes a heavy mass or inertia weight that is supported by a resilient material such as rubber. Any torsional vibrations in the crankshaft, as it rotates about its axis, will cause the mass to oscillate about this axis and thereby dissipate the energy of the vibrations in the resilient material. In order to be most effective it is desirable for the natural resonant frequency of the dampener assembly to be some predetermined amount.

It is the purpose of this invention to provide an apparatus that can be used for readily determining the natural resonant frequency of a torsional dampener. The present apparatus includes a spindle upon which the dampener is secured and made to oscillate about its axis. The speed or frequency of the oscillations is then varied until the resonant frequency of the dampener is found.

In order to observe the vibratory action of the dampener and particularly the inertia weight, a probe suspension is provided for maintaining a probe in direct contact with the dampener so as to vibrate therewith. This suspension includes an axially slidable member having a socket in one end for receiving a conical end of the probe to thereby permit the probe to oscillate about its end as a result of vibrations in the inertia weight. The axially slidable member is spring biased so that the probe will be held in a fixed extended position. However, when the probe engages a dampener to be tested, the spring will be compressed and the probe will be free to pivot about its ends. A pickup is mounted immediately adjacent the probe so that any movement of the probe will be sensed by the pickup to thereby produce a signal corresponding to the oscillations of the probe produced by the vibrations in the inertia weight.

In the drawings:

FIGURE 1 is a perspective view of a vibration dampener testing apparatus embodying the present invention.

FIGURE 2 is a longitudinal cross-sectional view of the probe suspension assembly used in the apparatus of FIGURE 1.

FIGURE 3 is a fragmentary plan view, with portions thereof being broken away, of the outer end of the probe suspension, taken substantially along the plane of line 3—3 in FIGURE 2.

Referring to the drawings in more detail, the present invention is particularly adapted for use in a measuring apparatus 10 for determining the resonant frequencies of torsional vibration dampener assemblies 12 such as employed on crankshafts of automotive engines. These dampener assemblies 12 normally include a center core or hub 14 adapted to be mounted on the crankshaft, an annular mass or inertia weight 16 and a resilient member 18 bonded between the hub 14 and the weight 16 so as to permit relative vibrations therebetween. Thus any torsional vibrations in the center hub 14 will cause the annular mass 16 to oscillate about the axis thereof whereby the resilient member 18 will absorb energy from the torsional vibrations. At the resonant frequency of the dampener 12, the amplitude of the vibrations of the inertia weight 16 will be a maximum and ninety degrees out of phase with the oscillations in the center hub 14.

The present test apparatus includes a horizontal base 20 for supporting a variable speed drive motor 22 regulated from a control panel 24 and a gear box 26 that is interconnected with the motor 22 to be driven thereby. The gear box 26 includes a vertical spindle or shaft 28 that projects upwardly from the top thereof for having the center hub 14 of the dampener 12 secured thereto. A series of cams and gears are provided for causing the drive motor 22 to produce torsional oscillations of the shaft 28 in a frequency range corresponding to those the dampener 12 will be subjected to during service and, particularly, the resonant frequency thereof.

In order to observe the vibrations of the dampener assembly 12, a probe suspension 30 is secured to the top of the gear box 26. This suspension 30 includes an elongated housing 32 welded on top of a rib 34 that is disposed radially to the spindle 28. The housing 32 includes a passage 36 that extends axially therethrough with a cylindrical inner portion 38, an outer portion 40 and a radial flange 42 that separates the two portions from each other. A sleeve 44 having a cylindrical exterior 46 is slidably disposed in the passage 36 for axial movement thereof. A guide plate 48 is secured across the end of the housing 32 to form a shoulder 47 around the end of the passage 36. An opening 50 through the guide plate 48 forms a passage for the reduced end 52 of the sleeve 44 to project therethrough. A spring 54 encompasses a portion of the sleeve 44 and biases it toward radial flange 42. The cylindrical surface of the sleeve 44 includes an annular groove 56 adapted to receive a spring biased detent 58 mounted on top of the housing 32. The detent 58 is biased into the groove 56 by a spring 60 and is removed by supplying compressed air to a cylinder 62 so that it can act on the piston face 64.

The interior of the sleeve 44 forms a passage having a cylindrical portion 68 and a small portion 70 that extends through reduced end 52 and is separated from the cylindrical portion by a shoulder 71. A plunger 72 is slidably disposed in the cylindrical portion 68 for movement axially thereof. A spring 74 acts on one end of the plunger 72 for biasing the plunger 72 toward the shoulder 71.

The probe 76 includes an elongated shank 78 having a point 80 on one end for engaging the dampener and having a head 82 on the other end. The head 82 includes a conical end 84 that fits into a complementary socket 86 in the end of the plunger 72.

It may thus be seen that, normally, the spring 54 will bias the sleeve 44 against the radial flange 42, while the other spring 74 will bias the plunger 72 so that the head 82 of the probe 76 will be forced against the shoulder 71 of the sleeve 44. As a result the probe 76 will be retracted and held with the shank 78 thereof parallel to the axis of the sleeve 44.

An air cylinder 88 is secured onto the outer end of the housing 32 so that a piston rod or ram 90 will extend lengthwise of the passage 36 and into the sleeve 44 for engagement with the end of the plunger 72. When the air cylinder 88 is energized the ram 90 will engage the plunger 72 and force it toward the dampener assembly 12. At the same time the head 82 of the probe 76 will be retained against the shoulder 71. This will in turn cause the sleeve 44 to slide axially of the passage 36 carrying the probe 76 with it. During this movement the probe 76 will advance toward the inertia weight 16 of the dampener 12 until the pointed end 80 of the probe 76 becomes embedded therein. As a result of the rapid forward movement of the sleeve 44 the annular groove 56 will pass under the detent 58 which thus descends into the annular groove 56 and locks the sleeve 44 in the extended position. Thus the spring 74 will be able to retain the pointed end 80 of the probe 76 embedded in the inertia weight 16.

In order to sense the movements of the probe 76 a variable reluctance pickup 92 is mounted on the housing 32 so that the core 93 thereof will be disposed immediately adjacent to the probe 76. The pickup 92 is connected through a signal amplifier 95 to an amplitude meter 96. Thus any movement of the probe 76 will cause a corresponding change in the reluctance of the pickup 92 and a signal will be provided that will indicate the movement of the probe 76.

In order to utilize the present apparatus 10 for testing a harmonic dampener 12, the dampener is placed on the vertical spindle 28 and the nut 29 is tightened so as to retain the dampener 12 in position thereon. After the dampener 12 is securely fastened in position, the air cylinder 88 is energized. This will cause the ram 90 to engage the end of the plunger 72 and force the probe 76 and sleeve 44 towards the spindle 28 until the pointed end 80 of the probe 76 strikes the surface of the dampener 12 and becomes embedded therein. During this movement the sleeve 44 will move sufficiently to permit the detent 58 to descend into the annular groove 56. When the air in the cylinder 88 is released and the ram 90 withdrawn, the spring 74 will remain compressed but the head 82 of the probe 76 will be clear of the shoulder 71 of the sleeve 44. As a consequence, the probe 76 will be compressed between the opposite ends thereof so that it is free to pivot thereabout. The motor 22 is then energized so as to cause oscillations of the spindle 28. This will induce corresponding vibrations in the dampener 12. As a result the inertia weight 16 will oscillate about the axis of the hub 14 so as to distort the resilient member 18 in the dampener 12. The vibrations of the inertia weight 16 will move the pointed end 80 of the probe 76 therewith so that the head 82 of the probe 76 will pivot in the socket 86 in the end of the plunger 72. At the same time the shank 78 of the probe 76 will move toward and away from the variable reluctance pickup 92 so that a signal will be produced indicative of the vibrations of the inertia weight 16. The speed of the motor 22 is then gradually increased until the resonant frequency of the dampener 12 is reached. This may be observed by the maximum amplitude of the vibrations in the inertia weight 16 as indicated by meter 96, and/or by any other well-known means. The speed of the motor or the freqency of the vibrations will be indicated on the face of the meter 94. After the resonant frequency of the dampener 12 has been determined the motor 22 is shut off and air applied to the cylinder 62 in the detent mechanism. This will retract the detent 58 and allow the sleeve 44 to be forced towards the air cylinder 88 and to extract the pointed end 80 of the probe 76 from the inertia weight 16. At the same time the spring 74 will bias the plunger 72 so as to force the head 82 of the probe 76 against the shoulder 71 on the sleeve 44. Thus, whenever the probe 76 is in a retracted position, it will be maintained parallel to the axis of the sleeve 44 in readiness for a repeat operation.

It is to be understood that, although the invention has been described with specific reference to a particular embodiment thereof, it is not to be so limited since changes and alterations therein may be made which are within the full intended scope of this invention as defined by the appended claims.

What is claimed is:

1. Vibration pickup apparatus comprising a stationary support having a first bore therein, a first member axially slidable in said bore, said first member having a second bore therein, a second member axially slidable in said second bore, a socket formed in one end of said second member, a probe member extending into said second bore, said probe member having a head portion pivotally received in said socket, resilient means in said second bore for biasing said second member against said probe to urge the same in a first axial direction, stop means carried by said first member and engageable with said probe when moved by said resilient means for preventing pivotal movement of said probe head in said socket, additional resilient means biasing said first member and stop means for movement in an axial direction opposite to said first axial direction, releasable latch means carried by said support for limiting said opposite direction movement, whereby said probe is free to move against said second member and said first resilient means to a position wherein said stop means is ineffective to prevent said pivotal movement, and means carried by said support for producing an output signal in response to the amplitude of pivotal movement of said probe.

2. Vibration pickup apparatus comprising a stationary support having a first bore therein, a first member axially slidable in said first bore, said first member having a second bore therein, a second member axially slidable in said second bore, a socket formed in one end of said second member, a probe extending into said second bore, said probe having a head portion pivotally received in said socket, first resilient means in said second bore for biasing said second member against said probe to urge the same in a first axial direction, stop means carried by said first member and engageable with said head portion for limiting said axial movement of said probe by said second member and first resilient means, second resilient means carried by said support and biasing said first member in an axial direction opposite said first direction, and a variable reluctance pickup carried by said support adjacent to said probe having an output responsive to the amplitude of said probe pivotal movement.

3. Vibration pickup apparatus comprising a stationary support member, a first member slidably carried by said support, first resilient means biasing said first member for movement relative to said support in one axial direction, releasable detent means carried by said support and engaging said first member in one position thereof for limiting axial movement of said first member by said resilient means, a second member slidably carried by said first member, second resilient means biasing said second member in an axial direction opposite to said one direction, a probe member pivotally connected to said second member and movable therewith in said opposite direction by said second resilient means, stop means carried by said first member limiting movement of said probe with respect to said first member in said opposite axial direction, controllable means engageable and disengageable with said second member for moving said second member and said probe with respect to said first member in said opposite axial direction until limited by said stop means and thereafter moving said second member, said probe, and said first member in unison against said first resilient means to said one position, wherein said detent means holds said first member from axial movement in said one direction after said controllable means disengages said second member, said probe and second member remaining movable with respect to said stop means against said second resilient means, and means carried by said support for producing an output signal in response to the amplitude of pivotal movement of said probe.

4. Vibration pickup apparatus comprising a stationary support member, a first member slidably carried by said support, first resilient means, biasing said first member for movement relative to said support in one direction, releasable detent means carried by said support and engaging siad first member in one position thereof for limiting movement of said first member by said resilient means, a second member slidably carried by said first member, second resilient means biasing said second member in a direction opposite to said one direction, a probe member pivotally connected to said second member and movable therewith in said opposite direction by said second resilient means, stop means carried by said first member limiting movement of said probe with respect to said first member in said opposite direction, said stop means preventing pivotal movement of said probe member when said probe member is engaged by said stop means, controllable means engageable and disengageable with said second member for moving said second member and said probe with respect to said first member in said opposite direction until limited by said stop means and thereafter moving said second member, said probe and said first member in unison against said first resilient means to said one position wherein said detent means holds said first member from movement in said one direction after said controllable means disengages said second member, said probe and second member remaining movable with respect to said stop means against said second resilient means, whereby said probe is free to pivot on said second member, and means producing an output signal in response to pivotal movement of said probe.

References Cited in the file of this patent

UNITED STATES PATENTS

| | | |
|---|---|---|
| 2,060,963 | Van Degrift | Nov. 17, 1936 |
| 2,471,601 | Albright | May 31, 1949 |
| 2,495,258 | Iatesta | Jan. 24, 1950 |
| 2,531,414 | Engvall | Nov. 28, 1950 |
| 2,596,048 | Severs | May 6, 1952 |
| 2,621,224 | Priest | Dec. 9, 1952 |
| 2,700,892 | Lowe | Feb. 1, 1955 |
| 2,716,887 | Smith | Sept. 6, 1955 |
| 2,729,972 | Schwidetzky | Jan. 10, 1956 |
| 2,753,948 | Ongaro | July 10, 1956 |
| 2,754,435 | Ongaro | July 10, 1956 |